United States Patent [19]

Shapiro et al.

[11] 3,745,321

[45] July 10, 1973

[54] METHOD OF CONTROL OVER OPERATING CONDITIONS OF AN APPARATUS FOR PLASMA-ARC TREATMENT OF ARTICLES AND AN APPARATUS FOR PLASMA-ARC TREATMENT

[76] Inventors: Ilya Samoilovich Shapiro, Leningradskoe shose, I, kv. 240; Lev Moiseevich Persits, Korovinskoe shosse, 7, korpus I, kv. 24; Mikhail Vasilievich Tkachev, Putevoi proezd, 8, kv. 59; Lev Efimovich Linetsky, Metrastroevskaya ulitsa, 13/12, Kv.13, all of Moscow, U.S.S.R.

[22] Filed: July 28, 1971

[21] Appl. No.: 166,692

[52] U.S. Cl................................ 219/121 P, 219/69 C
[51] Int. Cl................................................. B23b 1/06
[58] Field of Search .................... 219/121 P, 75, 76, 219/69, 69 C, 110, 108, 69 S, 69 M, 121 EB

[56] References Cited
UNITED STATES PATENTS

| | | | |
|---|---|---|---|
| 3,542,989 | 11/1970 | Sennowitz | 219/69 C |
| 3,594,299 | 7/1971 | Inoue | 219/69 C |
| 3,555,234 | 1/1971 | Lepp et al. | 219/121 P |
| 3,530,220 | 9/1970 | Ross | 219/69 C |
| 3,375,341 | 3/1968 | Richards | 219/69 C |
| 3,360,683 | 12/1967 | Inoue | 219/69 C |

*Primary Examiner*—J. V. Truhe
*Assistant Examiner*—B. A. Reynolds
*Attorney*—Holman & Stern

[57] ABSTRACT

An apparatus for treating an article or workpiece by plasma arc has a plasmatron, a cathode from which a plasma arc is struck to the workpiece through a conductive nozzle and a controlled current supply source having a control circuit and connected between the cathode and the workpiece. A voltage-sensitive element is also connected between the cathode and nozzle. The voltage-sensitive element is essentially a filter adapted to pass frequencies exceeding the ripple frequency of the plasma-arc supply source, and a threshold element. During a voltage jump between the cathode and the article the threshold element generates a pulse which is supplied to the control circuit of the plasma-arc supply source, thus causing discontinuation of the supply current increase and, consequently, obviating the plasma-arc current increase. This prevents undesirable erosion of the nozzle and causes a smooth operation of the apparatus.

3 Claims, 8 Drawing Figures

METHOD OF CONTROL OVER OPERATING CONDITIONS OF AN APPARATUS FOR PLASMA-ARC TREATMENT OF ARTICLES AND AN APPARATUS FOR PLASMA-ARC TREATMENT

BACKGROUND OF THE INVENTION

The present invention relates to improvements in methods of and apparatus for plasma-arc treatment of articles, and in particular to improvements in a method of control over operating conditions of an apparatus for plasma-arc treatment of articles and to apparatus for plasma-arc treatment. The present invention can be employed in plasma arc cutting, welding and deposition.

DESCRIPTION OF PRIOR ART

Widely known in the art is an apparatus for plasma-arc treatment of articles, comprising a plasma-arc torch, conveniently referred to hereinbelow as a plasmatron and a controlled source of current for exciting and maintaining a plasma arc burning between the cathode and article. A plasma-producing gas is supplied via the space of an electroconductive nozzle and, thus, the burning plasma arc passes through the nozzle.

Operating conditions of such an apparatus are controlled in the following manner.

Following the delivery to the nozzle of the plasma-producing gas, the plasma arc is excited between the cathode and article whereupon the electric current of the arc is smoothly increased to the operating value, that is, to a value at which the treatment is effected. Such a current increase is essential for increasing the plasma arc capacity, and the apparatus efficiency.

Between the nozzle walls and the plasma arc a layer of cold gas is present which serves to thermally and electrically insulate the plasma arc column from the nozzle walls. However, a current increase above a critical value may cause a breakdown of this cold layer.

As a result of such a breakdown, part of the arc current is shunted by the walls of the nozzle, which causes an intensive erosion of the latter and this results in a violation of the arc discharge symmetry and deterioration of the quality of treatment.

Moreover, the erosion of the nozzle results in a larger diameter of the nozzle passage, as well as lower current density and energy concentration in the nozzle passage, thus reducing the efficiency and affecting the quality of treatment.

And, finally, a violation of the nozzle geometry rules out the possibility of repeating the technological conditions of plasma-arc treatment, which is totally inadmissible in the case of precision plasma-arc treatment of articles.

The operation of replacing a disfigured and unserviceable nozzle or plasmatron causes unproductive loss of time.

Therefore, when employing such an apparatus, the preselected operating value of current should be lower than the permissible value in order to avoid breakdown. This, however, entails power underload of the apparatus and, as a result, lower efficiency and quality of treatment.

In the course of operating such an apparatus, the discontinuation of gas supply to the plasmatron (which should be considered in case of hose breakage, spontaneous increase of the plasma-arc current, or a nozzle contact with the article and the like,) may also cause the shunting of the plasma-arc current through the nozzle, resulting in nozzle erosion and the failure of the apparatus.

The known apparatus for plasma-arc operations such as cutting, comprises a current source provided by generators of pulsed and direct current connected in parallel with the cathode-article gap, a controller and a setter of the generator current amplitude. In this case, a precise adjustment for the best quality of the edges of cut at a preset efficiency and for the maximum efficiency at a preset quality of the edges of cut is possible only following repeated trial runs for each specific article involved.

Such adjustment operations involve unproductive loss of time, energy and materials and do not ensure optimum operating conditions.

DESCRIPTION OF THE INVENTION

It is an object of the present invention to develop a method that should provide for the possibility of operation at the maximum permissible values of the plasma-arc current, thus ensuring the maximum possible efficiency of the equipment and the best quality of treatment, at the same time providing for the erosionless operation of the plasmatron apparatus.

It is another object of the invention to develop an apparatus for plasma-arc treatment in which provision should be made for determining the moment of the electrical breakdown of the nozzle preceding any nozzle erosion.

Said and other objects of the present invention are accomplished owing to the fact that, while adjusting the operating conditions of an apparatus for plasma-arc treatment of articles, according to the invention, the voltage between the cathode and nozzle is measured and a jump of said voltage recorded, and with the appearance of each jump the arc current increase is discontinued.

The voltage jump occurs at the moment of breakdown of a layer of cold gas serving to thermally and electrically insulate the arc column from the nozzle walls. Monitoring this voltage jump provides reliable information regarding the beginning of shunting of the plasma-arc current through the nozzle.

Further increase of the arc current is likely to bring about the nozzle erosion. However, at the moment of the first voltage jump the nozzle erosion has not yet developed and, therefore, the discontinuation of the plasma-arc current increase fully precludes any nozzle erosion.

Such a method can be employed in an apparatus for plasma-arc treatment of articles comprising a controlled source of current for exciting and maintaining a plasma arc burning between a cathode and article the arc passing through the space of an electroconductive nozzle. In such an apparatus, according to the present invention, between the cathode and the nozzle a voltage-sensitive element is connected. Said element is formed by a filter adapted to pass frequencies exceeding the ripple frequency of the current source, and a threshold element that is connected by its output to the control input of the current source and adapted to generate, upon the occurrence at its input of a signal corresponding to a voltage jump, a pulse to discontinue the source current increase.

It is expedient that at the output of the voltage-sensitive element a pulse counter be placed, connected to the control input of the current source to disconnect the latter when the preset number of pulses is exceeded.

When employing an apparatus comprising a current source provided by a generator of direct current and a generator of pulsed current, connected in parallel with the cathode-article gap, the present invention uses a controller and a setter of the generator current amplitude. Between the cathode and nozzle a voltage-sensitive element is connected, which is formed by a filter adapted to pass frequencies exceeding the ripple frequency of both generators, and a threshold element connected to the controller and adapted to generate, upon a voltage jump, a pulse for the controller to shape a signal causing discontinuation of the increase of current of one of the generators, the amplitude controller and setter being connected to the current generators via a commutator having two stable states in each of which the controller and setter are connected to different generators.

Such a structural arrangement of the apparatus provides for the automation of the process ensuring a high speed of treatment and operating conditions resulting in a high quality of treatment, while maintaining constantly the optimum conditions of the plasma arc burning.

BRIEF DESCRIPTION OF DRAWINGS

The present invention will be more apparent upon considering the following detailed description of the specific embodiments thereof with due reference to the accompanying drawings, in which.

DESCRIPTION OF PREFERRED EMBODIMENTS

Figure 1:
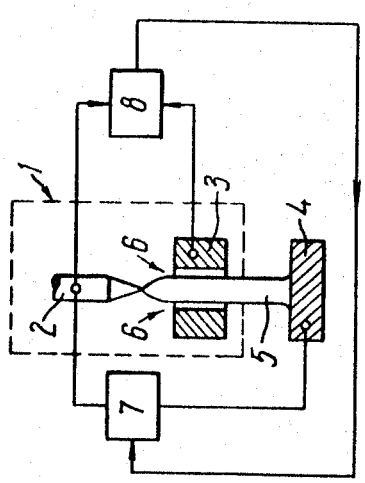
FIG. 1 is a block diagram of an apparatus for plasma-arc treatment of articles, revealing the principle of the disclosed method.

Referring now to FIG. 1 of the accompanying drawings, the apparatus for plasma-arc treatment according to the present invention comprises a plasmatron 1 with a cathode 2, mainly, of lanthanized tungsten, and a water-cooled copper nozzle 3. Burning between the cathode 2 and an article 4 is a plasma arc 5 stabilized by a plasma-producing gas supplied to the nozzle 3 as shown by arrows 6. Between the cathode 2 and the article 4 is connected a controlled source 7 of current for the electric supply of the plasma arc 5. Between the cathode 2 and the nozzle 3 is connected a voltage-sensitive element 8 whose output is connected in the control circuit of the supply source 7.

Figure 2:
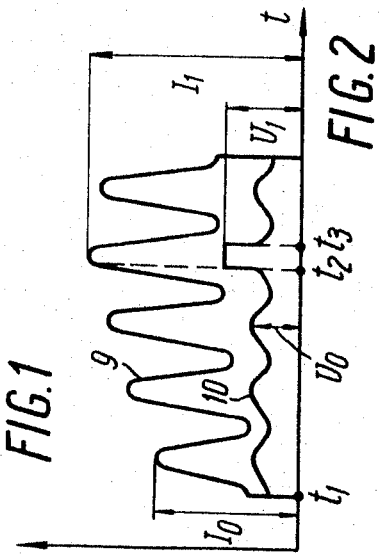
FIG. 2 is a graph showing variations of plasma-arc current and voltage between the cathode and nozzle.

Upon a smooth variation of the current (curve 9, FIG. 2) of the plasma arc 5, amplitude $U_o$ (curve 10) of the voltage between the cathode and nozzle remains essentially constant. In the graph, the moment $t_1$ corresponds to the commencement of the ignition of the arc 5, while the voltage amplitude $U_o$ corresponds to the normal burning of the arc. As found by the present inventors, at a certain value of current amplitude $I_1$ corresponding to the electric breakdown and shunting of the current of the arc 5 through the nozzle 3, there takes place an instantaneous voltage jump to amplitude $U_1$. In the graph, $t_2$ and $t_3$ are, respectively, the moments of the beginning and end of said jump, corresponding to the time of action of the current $I_1$ or somewhat exceeding the latter.

Hereinafter, the values of the current and voltage amplitudes will be referred to by the corresponding amplitudes of current and voltage,; for instance, current $I_1$, means current amplitude $I_1$.

As shown by experience, a short-time action of the current $I_1$ does not cause the nozzle erosion. Therefore, by a timely discontinuing of the increase of the current $I_1$, the nozzle is protected from erosion.

Consequently, by monitoring the occurrence of a voltage jump between the cathode 2 and the nozzle 3 and discontinuing the arc current increase following this occurrence, the nozzle 3 can be protected from erosion.

The voltage-sensitive element 8 should therefore respond to a voltage jump between the cathode 2 and the nozzle 3 and, upon the occurrence of said jump, generate a pulse which, when supplied to the control circuit of the source 7, should cause the discontinuation of the plasma-arc current increase. To this end a voltage-sensitive element can be used, for instance, in the form of a multivibrator adapted to generate, upon the supply thereto of an input pulse, a master pulse supplied to the control circuit of the source 7 to cause a discontinuation of the current increase. A voltage jump will cause such a master pulse according to the method disclosed herein.

The description here-in-below considers in more detail the essence of the method of control over the working conditions of the apparatus according to the present invention.

A plasma-producing gas is supplied via the nozzle 3, the supply source 7 is actuated and the plasma arc 5 is excited between the cathode 2 and the article 4 in any conventional manner. While so doing, current amplitude $I_o$ is preselected to be lower than the amplitude $I_l$ of a current at which a breakdown of the cold gas layer may occur. The current is smoothly increased in the time interval of from $t_1$ to $t_2$ (cf., FIG. 2).

At the moment of time $t_2$ the current of the arc 5 reaches critical value, the voltage jumping to $U_l$. Inasmuch as the voltage-rise rate at the moment $t_2$ exceeds considerably the rate of the voltage variation at a normal burning of the arc, this variation is taken up by the voltage-sensitive element, namely, the multivibrator, as a pulse, and the multivibrator acts upon the source 7 to cause the discontinuation of its current increase. Thus, erosionless operation of the plasmatron is ensured.

Figure 3:
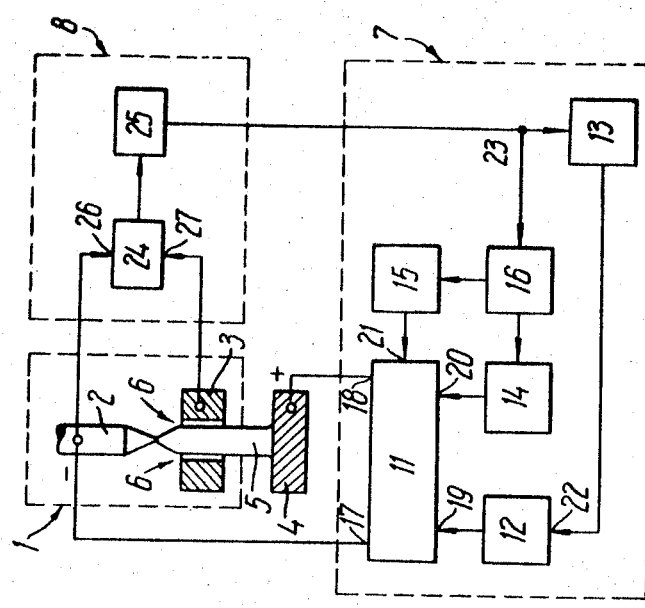
FIG. 3 is a block diagram of one of the embodiments of the apparatus for plasma-arc treatment according to the present invention.

In the case of a plasma arc apparatus using a d.c. electric supply, the, block diagram as shown in FIG. 3 of the drawings.

This latter apparatus comprises a plasmatron 1 with a cathode 2 and nozzle 3. Between the cathode 2 and an article 4 burns a plasma arc 5 passing inside the nozzle 3. A controlled source 7 of electric supply of the plasma arc 5 is connected between the article 4 and the cathode 2. The source 7 includes a direct-current generator 11, a current increase unit 12, a current fixing unit 13, a current decrease unit 14, a magnetic starter 15 and a pulse counter 16.

Outputs 17 and 18 of the generator 11 are connected to the cathode 2 and the article 4, respectively. Inputs 19, 20 and 21 of the generator 11 are respectively connected to the outputs of the current increase and decrease units 12 and 14 and of the magnetic starter 15. The inputs of the units 14 and 15 are connected to the outputs of the pulse counter 16, and the input 22 of the unit 12 - to the output of the unit 13. The inputs of the unit 13 and counter 16 are combined to form the input 23 of the controlled source 7 of the arc electric supply.

Between the cathode 2 and the nozzle 3 is connected a sensitive element 8 formed by series-connected electric filter 24 adapted to pass frequencies exceeding the ripple frequency of the current of the source 7, and a threshold element 25 adapted to generate, upon a voltage jump between the cathode 2 and the nozzle 3, a pulse signal. Serving as the input of the sensitive element 8 are inputs 26 and 27 to the filter 24, and as the output — the output of the element 25 which is connected to the input 23 of the source 7.

The apparatus illustrated in FIG. 3 operates in the following manner.

Figure 5:
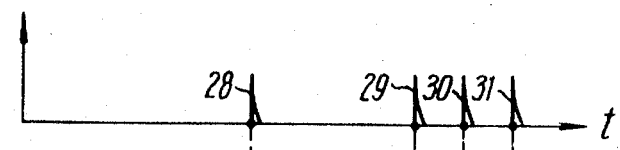
FIG. 5 shown pulses at the output of the voltage-sensitive element connected between the cathode and nozzle.

The current increase unit 12 affects the direct-current generator 11, which causes an increase of the current of the arc 5 to the amplitude $I_1$ (cf., FIG. 4) in the period of time from $t_1$ to $t_2$. At the moment $t_2$ the current reaches the amplitude $I_1$ at which the first breakdown of the cold gas layer occurs, to which corresponds the appearance of a pulse 28 (FIG. 5) at the output of the sensitive element 8.

This latter pulse affects the current value fixing unit 13 (cf., FIG. 3) and the pulse counter 16. The unit 13 causes the current increase unit 12 to cease operation. Further on, the controlling effect of the unit 12 upon the generator 11 remains unchanged in the course of the operation until the generator is switched off. Concurrently, the pulse 28 is supplied to the input of the counter 16. The latter delivers a signal to the current decrease unit 14. The unit 14 affects the generator 11 causing the current of the arc 5 to decrease from the amplitude $I_1$ to amplitude $I_2$. This decrease is usually equal to 2–10 percent of the amplitude $I_1$. At the amplitude $I_2$ of the current of the arc 5 the treatment of the article takes place. In the case of an emergency situation such as the discontinuation of gas supply or reduced consumption thereof, as well as the contact of the nozzle 3 with the article 4, etc., pulses 29, 30 occur at the output of the sensitive element 8 which causes a successive decrease of current to amplitudes $I_3$ and $I_4$ under the effect of signals delivered from the counter 16 through the unit 14 to the input of the generator 11. Upon the arrival of a signal 31, there takes place the filling-in of the counter 16 which in this case delivers a signal to the magnetic starter 15 to disconnect the generator 11 from the supply of the arc 5.

Figure 6:
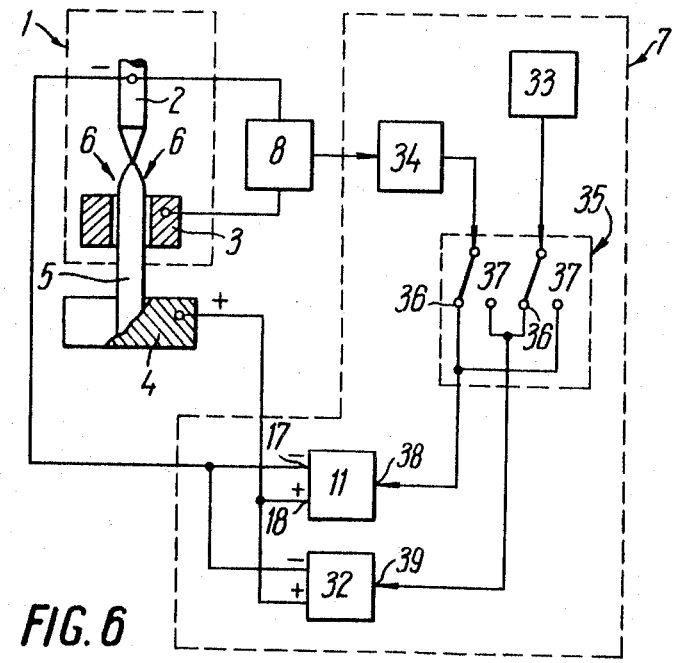
FIG. 6 is a block diagram of an embodiment of the apparatus for plasma-arc cutting.

FIG. 6 shows a block diagram of an apparatus for accomplishing the method according to the present invention, which can be employed for plasma-arc cutting.

The apparatus comprises a plasmatron 1 with a cathode 2 and a nozzle 3. Between the cathode 2 and an article 4 burns a plasma arc 5 stabilized with gas supplied inside the nozzle 3 as indicated by arrows 6.

Connected between the cathode 2 and the article 4 is a controlled source 7 for the supply of the arc 5, whose input is connected to the output of a sensitive element 8. The inputs of the sensitive element 8 are connected to the cathode 2 and the nozzle 3 of the plasmatron 1.

The source 7 includes a direct-current generator 11, a pulsed-current generator 32, a generator current setter 33, a generator current controller 34, and a commutator 35 having two stable states 36 and 37.

Figure 4:
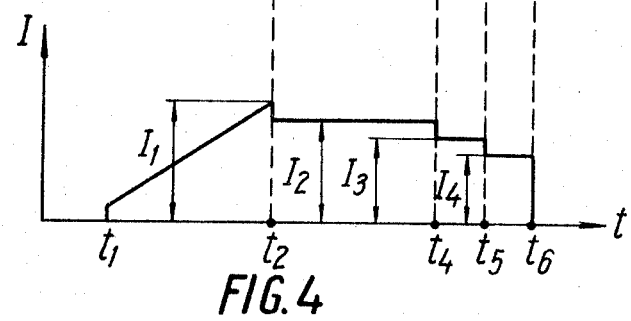
FIG. 4 is a graph showing variations of the plasma-arc current.

The controller 34 may incorporate elements 12, 13, 14, 15 and 16 (cf., FIG. 3) and provides for the variation of current of one of the generators in accordance with FIG. 4.

The like outputs of the generators 11 and 32 are combined and form outputs 17 and 18 of the source 7.

Control inputs 38 and 39 of the generators 11 and 32 are respectively connected via the commutator to the outputs of the setter 33 and controller 34.

When the commutator 35 is in the position shown at 36, the output of the controller 34 is connected to the input 38 of the direct-current generator 11, while the output of the setter 33 is connected to the input 39 of the pulsed-current generator 32.

When the commutator 35 is in the position shown at 37, the output of the controller 34 is connected with the input 39 of the pulsed-current generator 32, while the setter 33 is connected with the input 38 of the direct-current generator 11.

Figure 7:
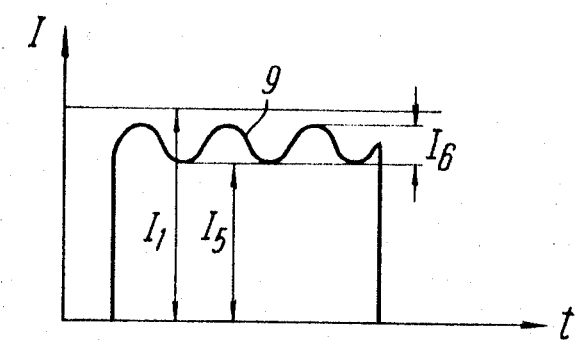
FIG. 7 is a graph showing time variations of the plasma-arc current corresponding to the high efficiency of cutting.

In such an apparatus, high-efficiency operating conditions are characterized by a relatively large amplitude $I_5$ (FIG. 7) of the current of the direct-current generator 11 and a small value of an amplitude $I_6$ of current of the generator 32.

Figure 8:
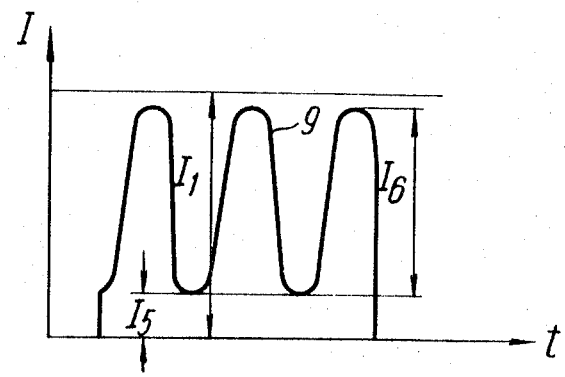
FIG. 8 is a graph showing time variations of the plasma-arc current corresponding to the high quality of the edges of cut.

A high quality of the edges of cut in the work piece are provided for by operating conditions corresponding to a small current value $I_5$ (cf., FIG. 8) and a high value $I_6$ of the current pulses.

This apparatus illustrated by FIG. 6 operates in the following manner.

In case it is necessary to obtain a specific quality of the edges of cut, the commutator 35 is set to the position shown at 36 and the required value of pulse current from the generator 32 is set by means of the setter 33. Following the switching-on of the apparatus, the amplitude of direct current of the generator 11 will increase under the effect of the controller 34 until the summary amplitude value of current of the plasma arc 5 reaches the value of $I_1$ (cf., FIG. 4). Further on, under the effect of signals from the output of the sensitive element 8, the summary value of current of the arc 5 will assume the working value of $I_2$ owing to a decrease in the direct current of the generator 11.

Thus, there will automatically be attained the maximum permissible efficiency at a preset quality of the edges of cut also ensuring complete absence of erosion of the plasmatron nozzle.

In case a specific cutting efficiency is required, the commutator 35 is set to the position shown at 37 and the required value of direct current from the generator 11 is set by means of the setter 33.

After switching-on the apparatus, the value of pulsed current from the generator 32 will increase under the effect of the controller 34 until the summed amplitude value of current of the plasma arc 5 reaches the value of $I_1$ (cf., FIG. 4). Further on, under the effect of signals from the output of the sensitive element 8, the summation value of current of the arc 5 will assume the working value of $I_2$ owing to a decrease in the pulsed current of the generator 32.

While so doing, there will automatically be attained the best quality of the edges of cut at a preset efficiency and in the complete absence of erosion of the plasmatron nozzle.

In case of emergency conditions, the pulses 29 and 30 (FIG. 5) affect one of the generators controlled by the controller 34, decreasing the summation current of the arc 5 to the values of $I_3$ and $I_4$.

The present invention is advantageous in that it provides for the protection of the nozzle from failure in an emergency situation such as the discontinuation of gas supply, the nozzle contact with the article, spontaneous current increase, etc. When using the pulsed current electric supply of the plasma arc, the apparatus according to the present invention makes it possible to provide for the best possible quality of the edges of cut on a workpiece at a preset efficiency and for the maximum efficiency at a preset quality of the edges of cut. The present invention helps effect plasma-arc treatment under the maximum permissible current conditions providing for the highest possible quality and efficiency of the process obviating any erosion of the plasmatron nozzle.

What is claimed is:

1. An apparatus for plasma-arc treatment of an article, comprising: a plasma-arc torch including a cathode and an electro-conductive nozzle through which a plasma-producing gas passes, a plasma arc passing inside said nozzle and burning between said cathode and said article; a current source having a control circuit and connected between the cathode and said article and adapted to supply electric current to said plasma arc; a voltage-sensitive element connected between said cathode and nozzle, which voltage-sensitive element is formed by an electric filter adapted to pass frequencies exceeding a ripple frequency of said source and a threshold element connected to the filter output and connected by the output to the control circuit of said source, said threshold element being adapted to generate, upon the supply to its input of a signal corresponding to a voltage jump between the cathode and the nozzle, a pulse supplied to the input of said control circuit to cause a discontinuation of the arc current increase.

2. An apparatus according to claim 1, wherein between the output of the voltage-sensitive element and the input of the control circuit of the source there is placed a pulse counter adapted to fully disconnect said supply source when a preset number of pulses is exceeded.

3. An apparatus for plasma-arc cutting of an article, comprising: a plasma-arc torch including a cathode and an electro-conductive nozzle through which a plasma-producing gas passes, a plasma arc passing inside said nozzle and burning between said cathode and article; a current supply source having a control circuit and electrically connected between said cathode and article, the afore-said source being made up by controllable pulse and direct current generators connected in parallel with a cathode-article gap; a setter of current amplitude of said generators; a controller of current amplitude of said generators; a voltage-sensitive element connected between said cathode and nozzle, said voltage-sensitive element being formed by a filter adapted to pass frequencies exceeding a ripple frequency of said supply source and a threshold element connected to the filter output, connected by its output to the controller and adapted to generate, upon the occurrence at the filter output of a signal corresponding to a voltage jump between the cathode and the nozzle, a pulse for said controller to shape a signal causing a discontinuation of current increase from said current supply source; a commutator having two stable states, via which commutator said setter and controller are connected to the current source for their separate connection in each of the commutator states with said pulse and direct current generators.

* * * * *